United States Patent [19]

Spector et al.

[11] Patent Number: 4,552,663

[45] Date of Patent: Nov. 12, 1985

[54] PROCESS FOR THE REMOVAL OF AMMONIACAL NITROGEN IN THE BOD SORPTION ZONE OF A WASTEWATER TREATMENT PLANT

[75] Inventors: Marshall L. Spector, Allentown; Sun-Nan Hong, Emmaus, both of Pa.

[73] Assignee: Air Products and Chemicals, Inc., Allentown, Pa.

[21] Appl. No.: 636,208

[22] Filed: Jul. 31, 1984

[51] Int. Cl.$^4$ ............................................. C02F 3/30
[52] U.S. Cl. ..................................... 210/605; 210/623; 210/630; 210/903
[58] Field of Search ............... 210/605, 903, 614, 623, 210/630

[56] References Cited

U.S. PATENT DOCUMENTS 3,964,998 6/1976 Barnard ................................ 210/605
3,994,802 11/1976 Casey et al. ......................... 210/605
4,056,465 11/1977 Spector ................................ 210/605
4,162,153 7/1979 Spector ............................ 210/903 X
4,271,026 6/1981 Chen et al. ....................... 210/903 X

*Primary Examiner*—Thomas Wyse
*Attorney, Agent, or Firm*—Mark L. Rodgers; E. Eugene Innis; James C. Simmons

[57] ABSTRACT

The present invention provides for an improved method of operating an activated sludge system whereby a significant amount of ammoniacal nitrogen is removed in the BOD sorption zone, which does not later appear in the system as protein or NOX. The improved method for achieving said ammoniacal nitrogen removal comprises decreasing the ammoniacal nitrogen concentration of the mixed liquor in the oxidation zone to a point where the mixed liquor leaving the oxidation zone has an ammoniacal nitrogen concentration less than about 0.3 ppm. Additionally, an overall $F/M_o$ ratio equal to or greater than about 0.05 is maintained.

6 Claims, 1 Drawing Figure

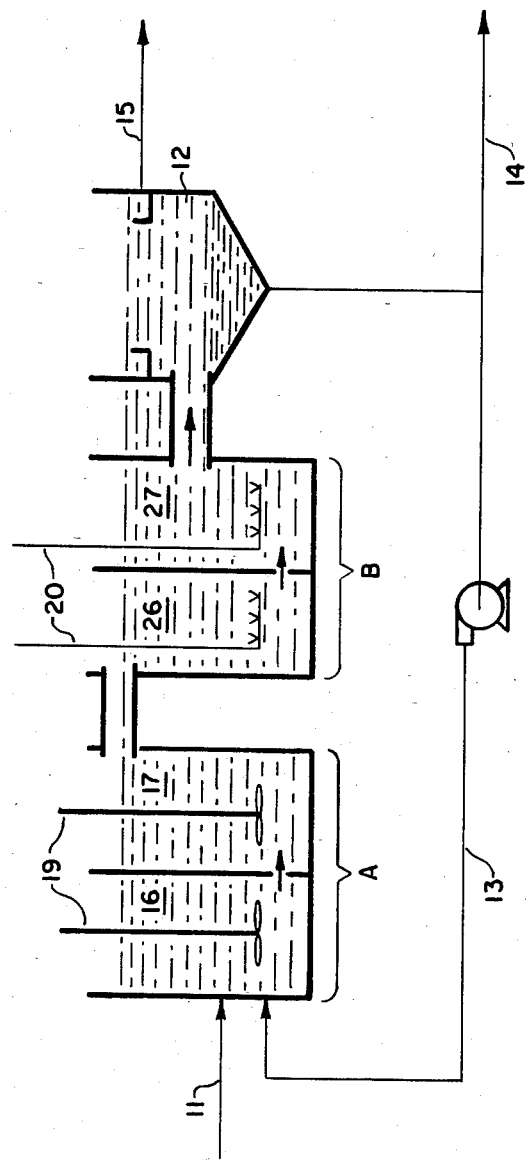

PROCESS FOR THE REMOVAL OF AMMONIACAL NITROGEN IN THE BOD SORPTION ZONE OF A WASTEWATER TREATMENT PLANT

TECHNICAL FIELD OF INVENTION

The present invention relates to improvements in the ability of biological wastewater treatment systems to remove nitrogen values from influent wastewater. It deals with the enhanced removal of ammonia values in biological systems in which complete or nearly complete conversion of ammonia to nitrite and/or nitrate (referred to collectively as NOX) is occurring.

BACKGROUND OF THE INVENTION

The activated sludge process has been used for many years for the removal of both biological (or alternatively biochemical) oxygen demand (BOD) and ammoniacal nitrogen values from wastewater. The BOD which is usually expressed as $BOD_5$, generally, and in the present invention, refers to the oxidation of organic carbon compounds by heterotropic microorganisms. The oxidation of ammoniacal nitrogen values is effected by autotrophic microorganisms which derive their energy for growth by oxidation of ammoniacal nitrogen values to NOX. The energy so produced is then utilized to produce protein material from inorganic components such as water, carbon dioxide and ammonia.

It is known that both the BOD and ammoniacal nitrogen values can be removed from wastewater in a single sludge system, the latter being removed by oxidation of ammonia to NOX. In those cases in which denitrification is required, the NOX may be reduced to volatile nitrogen compounds such as $N_2O$ or $N_2$. Alternatively, a substantial volume of NOX-containing wastewater may be recycled to an anoxic zone within a wastewater treatment system such as that described in FIG. 2 of U.S. Pat. No. 4,056,465 and one form of that which is described by J. Barnard, Water and Waste Engineering (1974) 33, and the subject of South African Pat. No. 725371.

In systems of this type, the NOX is reduced, to form $N_2$ for example, by serving as an electron receptor for sorbed organisms. In these cases, the oxidizing power of the NOX is utilized for the oxidation of organic carbon compounds. All biological wastewater processes which are capable of effective nitrification must provide for longer sludge ages relative to the sludge age for systems which require removal of BOD alone. The minimum sludge age for nitrification systems of this type varies from about one-and-a-half days at 30° C. to about 10 days at 10° C.

The removal of ammoniacal nitrogen values is important for those systems in which the oxygen demand of ammonia degrades the quality of the receiving stream by removing oxygen values. The total removal of nitrogen values, including both ammonia and NOX is important when the element nitrogen is harmful in that it causes excessive growth of flora and/or algae in receiving streams.

BRIEF SUMMARY OF THE INVENTION

The present invention provides for an improved method of operating a typical activated sludge system whereby ammoniacal nitrogen is removed in the BOD sorption zone.

The basic method for operating a typical activated sludge system comprises:

(a) forming a mixed liquor in a BOD sorption zone, said mixed liquor being formed by mixing an activated biomass with a soluble $BOD_5$ and ammonia containing wastewater influent under conditions such that at least 25% of the soluble $BOD_5$ is sorbed by said biomass;

(b) oxidizing the $BOD_5$ in the mixed liquor, including at least part of the $BOD_5$ sorbed in said biomass, in an oxidation zone by contacting the mixed liquor with an oxidizing agent, said oxidizing being effective for oxidizing at least 30% of the total influent $BOD_5$ in the mixed liquor;

(c) settling the resulting oxidized mixed liquor in a settling zone thereby forming a supernatent liquor and a dense sludge containing activated biomass; and (d) recycling at least a portion of the dense sludge to the BOD sorption zone.

Removal, in the BOD sorption zone, of ammoniacal nitrogen entering this type of system is achieved by decreasing the ammoniacal nitrogen concentration of the mixed liquor in the oxidation zone such that the ammoniacal nitrogen concentration in the mixed liquor leaving said zone is less than about 0.3 ppm and maintaining an overall $F/M_o$ ratio equal to or greater than about 0.05.

The conventional method for removal of nitrogen values from wastewater treatment systems has been by the oxidation of ammonia to NOX followed by the reduction of NOX to volatile compounds, such as $N_2$ and/or $N_2O$. This is accomplished by oxidation of all or nearly all of the influent ammoniacal nitrogen values along with the $BOD_5$ in the oxidation zone, requiring a large input of oxygen or other oxidizing agent.

The method of the present invention allows for the removal of significant; i.e., greater than 2 ppm; ammoniacal nitrogen values in the BOD sorption zone. The value of ammoniacal nitrogen greater than 2 ppm removed in the BOD sorption zone does not subsequently reappear as protein material or NOX in the system. Consequently, the present system results in less $NH_4$ to be oxidized in the BOD oxidation zone and therefore requires significantly less oxidizing agent to be added. Additionally, since less NOX is formed, a less extensive denitrification process is required to reduce the NOX to volatile nitrogen compounds such as $N_2$ and $N_2O$.

TERMS AND DEFINITIONS

As employed in defining the parameters of the present invention:

1. F denotes the mass of soluble BOD fed to a given wastewater treating system at a given time extrapolated for 24 hours.

2. $M_s$ is the mass of biomass measured as mixed liquor volatile suspended solids (MLVSS) in the BOD sorption zone.

3. $M_o$ is the mass of biomass measured as mixed liquor volatile suspended solids (MLVSS) in the BOD oxidation zone and the anoxic zone if present.

BRIEF DESCRIPTION OF THE DRAWING

The single FIGURE of the accompanying drawing is a schematic and diagrammatic side view of a simplified system for the practice of the present invention.

DETAILED DESCRIPTION OF THE INVENTION

Referring to the accompanying drawing, a modified activated sludge treating facility is represented, in many respects similar to that depicted in FIG. 1 of U.S. Pat. No. 4,056,465. The $NH_3$ containing wastewater to be treated, generally but not necessarily as clarified wastewater from a primary sedimentation tank or clarifier (not shown), initially enters the BOD sorption zone A through the inlet 11. In the sorption zone A the influent wastewater is admixed with recycled sludge settled in sedimentation tank or secondary clarifier 12 and recycled to zone A by line 13. The amount of recycle is determined by the load of the system and is increased during periods of peak loading. A minor portion of the settled sludge is removed by line 14. The purified supernatant liquid is sent via line 15 to receiving streams or reservoirs with or without further treatment as need be.

As shown, zone A is preferably partitioned to provide two or more liquid treating sections in order to approximate plug flow of the liquid through the BOD sorption zone A. It has been found that by provision of physically partitioned sections or the hydraulic equivalent thereof, there is better assurance of achieving the desired freedom from filamentous growth and thereby attaining good sludge characteristics even under adverse conditions. Such adverse conditions, for example, include operation with low concentrations of BOD wherein high surface area microorganisms would have an advantage in competing for sorption of BOD at low concentration. Bypassing of untreated BOD through the BOD sorption zone is minimized. In the particular embodiment illustrated, zone A is shown as partitioned into two sections or chambers 16 and 17, each equipped with stirring means 19. The liquid passes in proximate plug flow through the several sections of zone A and is discharged into BOD oxidation zone B.

While zone A is shown as having two partitioned sections 16 and 17, it will be understood that three or more such sections may be employed. Zone A and B may be separate interconnected vessels provided with suitable means for effecting substantial uni-directional flow of liquid from zone A to zone B with minimal back mixing.

Aeration of the liquid is effected in a zone B in known manner; thus, as shown, compressed air may be admitted into the bottom of the oxidation zone by spargers 20. If desired, instead of or in addition to spargers, the oxidation zone B may be provided with mechanical aerators. Also, instead of air, oxygen of any desired purity may be admitted to zone B, in which event suitable means for covering all or part of the zone may be required. In practice, some oxidation, preferably as up to no more than about 1% of the total $BOD_5$ and ammonia in the influent may occur in zone A, but normally substantially all the oxidation occurs in zone B.

As illustrated in the drawing, zone B is partitioned into two liquid treating sections 26 and 27, although, as will be understood, a larger number of such sections may be employed if so desired. One of the reasons for staging in zone B in the present system is because ammonia oxidation is usually observed to be a first order relation with respect to soluble ammonia concentration; thus a low value of ammonia in the effluent is best obtained with plug flow configuration.

Zone A is herein designated a BOD sorption zone of a wastewater treatment plant. The term "BOD sorption zone" with respect to the described system of the present invention has reference to and is defined as that zone of a wastewater treatment plant in which the influent wastewater and recycled sludge are initially mixed and, in which, the addition of oxidizing agents is intentionally avoided, and at least 25% and preferably at least 50% of the soluble $BOD_5$ content of the influent wastewater is transferred from the aqueous phase of the mixed liquor to the solid sludge. The term "soluble $BOD_5$" refers to biological oxygen demand which passes through a 1.25 micron glassfiber filter, exclusive of oxygen needed for oxidation of nitrogen values.

To obtain the stated extent of transfer of the soluble $BOD_5$ from the aqueous phase to the solid sludge, it is important that the $F/M_s$ ratio in the sorption zone is maintained at less than 10 and preferably at less than 5.

Thus, the principal oxidation of both BOD and ammonia present in the influent wastewater takes place in oxidation zone B. The term "oxidation zone" as employed with reference to the present system is defined as that zone of a wastewater treatment plant in which means for oxygen mass transfer are employed and the mixed liquor from the BOD sorption zone is contacted with oxygen and/or oxidizing agents under conditions and for a time sufficient to oxidize at least 30 percent of the total $BOD_5$.

As has already been indicated above, it is important that oxidation be minimized in the BOD sorption zone. To assure that the extent of oxidation in the BOD sorption zone is minimal, one or more of the following steps may be taken:

A. The vessel (or vessels) constituting zone A may be provided with a blanket of nitrogen or other inert gas at the liquid surface to avoid access thereto of atmospheric air; or a loose fitting cover my be provided at or above the liquid surface, or a rigid cover may be provided above the liquid surface with or without an inert gas blanket. Instead of, or in addition to these indicated ways of limiting the extent of oxidation, if any, that could take place in the BOD sorption zone, nitrogen purge gas may be admitted into zone A.

B. Means for gaseous mass transfer are excluded from the BOD sorption zone. The zone is equipped with stirrers, as illustrated, for example, by reference 19 in the drawing, as opposed to spargers, surface aerators, or other gas-liquid mass transfer devices.

C. Care must be taken to avoid introduction of excessive quantities of any oxidizing agent, such as nitrate and/or nitrite (NOX) into the BOD sorption zone. The latter involves control of not only NOX that might be present in the wastewater influent but also NOX that might be recycled to that zone from a downstream source in the system.

Wastewater normally contains little or no NOX in the influent due to reduction of any nitrates and/or nitrites by BOD in the presence of microorganisms in the sewer lines feeding the treatment plant. A potential source of NOX is from recycled mixed liquor from the BOD oxidation zone of nitrifying biological systems, i.e. those which are designed to effect oxidation of ammoniacal nitrogen to NOX. In such systems, as illustrated in FIG. 2 of U.S. Pat. No. 4,056,465, wherein an anoxic zone is interposed between the initial BOD sorption zone and the oxidation zone, a portion of the mixed liquid from the oxidation zone is recycled to the intermediate anoxic zone to effect reduction of NOX therein.

Wastewater influent generally contains significant amounts of nitrogen in the form of ammoniacal nitrogen or $NH_3$. In the above-described, or similar types of activated sludge systems, nitrogen values are conventionally removed by the oxidation of ammonia to NOX in the oxidation zone, followed by reduction of the NOX to volatile compounds, such as $N_2$ and/or $N_2O$.

It has now been found that, in this type of system, a portion of the ammoniacal nitrogen can be removed in the BOD sorption zone without the production of protein or the production of NOX which must later undergo denitrification. The conditions necessary to effect this ammoniacal nitrogen removal in the BOD sorption zone include decreasing the ammoniacal nitrogen concentration of the mixed liquor in the oxidation zone to a point such that the wastewater leaving the oxidation zone has an ammoniacal nitrogen concentration less than about 0.3 ppm, and maintaining an $F/M_o$ ratio equal to or greater than about 0.05. The ammoniacal nitrogen concentration of the mixed liquor can be decreased in the oxidation zone by any conventional means, e.g., via oxidation by autotrophic microorganisms. The method used to decrease the ammoniacal nitrogen in the oxidation zone is not critical, but it must be effective for maintaining the ammoniacal nitrogen concentration below the required level.

Maintaining these conditions in this type of activated sludge system results in greater than 2 ppm and preferably greater than 5 ppm ammoniacal nitrogen removal in the BOD sorption zone. Ammoniacal nitrogen values in excess of about 2 ppm which are removed in this zone do not reappear in the system as protein or NOX.

The conventional method does not account for the disappearance of ammonia by the process of the present invention in that there is stoichiometrically insufficient oxidizing reagent introduced into the initial sorption zone to account for this removal via oxidation to NOX. Additionally the amount of NOX and protein which appears in subsequent stages of the system can account for only a small (e.g. less than 2 ppm) portion of the ammoniacal nitrogen removed. The exact mechanism promoting this ammoniacal nitrogen removal is not known, however, under the conditions maintained in the oxidation zone as set out above, growing microorganisms are deprived of nitrogen in the minus three valence, i.e., ammonia, and are apparently unable to utilize NOX as a source of nitrogen from which to build protein. Exposing these microorganisms to conditions in which they have growth potential but are limited by the availability of reduced nitrogen causes unusual behavior in that, when they are passed to a clarifier, settled, and returned to the initial sorption zone, they apparently cause the removal of significant (i.e. greater than 2 ppm) quantities of ammoniacal nitrogen from the influent wastewater, which does not reappear within the system as NOX, protein or other detectable nitrogenous compounds.

A minimum $F/M_o$ ratio of at least about 0.05 is required to insure that the microorganisms still have growth potential when they are discharged from the oxidation zone of the system.

In order to remove ammoniacal nitrogen values in the manner described above, the biomass leaving the oxidation zone must experience low ammonia concentration, i.e. less than 0.3 ppm, preferably for the entire day. To the extent that this value is exceeded, i.e. operating at values higher than 0.3 ppm and even as high as 10 ppm during peak flow of a given day, the biomass will become deconditioned such that upon a subsequent passage through the plant, the extent of ammoniacal nitrogen removal will not be experienced. In those plants which show a breakthrough of high ammonia concentration in the effluent during a portion of the day, this breakthrough is almost invariably associated with peak flow which can last from 6 to 12 hours depending upon the specific location of the facility. The longer that the concentration of ammoniacal nitrogen is the mixed liquor leaving the BOD oxidation zone exceeds 0.3 ppm, the greater the deconditioning and the lower the effectiveness of ammonia removal by the method of this invention.

Therefore, in order to achieve the desired level of $NH_3$ removal in the sorption zone, it is necessary to maintain the system such that the $NH_3$ concentration of the mixed liquor leaving the BOD oxidation zone does not exceed 0.3 ppm for a substantial part of the day. A substantial part of the day, for purposes of this invention, being at least 12 hours, and preferably at least 18 hours of a given 24 hour period.

The present invention is also applicable to activated sludge systems in which an anoxic zone is interposed between the BOD sorption and BOD oxidation zones, as discussed and shown in FIG. 2 of U.S. Pat. No. 4,056,465.

While the above embodiments describe the present invention in the context of a typical activated sludge system, the present invention is applicable to any system if the following conditions are met:

(1) An initial BOD sorption zone is provided;
(2) A subsequent oxidation zone is provided and designed such that the removal of ammoniacal nitrogen values is complete, or nearly complete, prior to discharge of the wastewater from this zone to a clarifier;
(3) There is still growth potential for the microorganisms prior to discharge from the oxidation zone; and
(4) At least a portion of the settled sludge from the clarifier is recycled to the initial BOD sorption zone.

By removing significant quantities of ammoniacal nitrogen in the initial sorption zone, less oxidation is required in the subsequent BOD oxidation zone to convert ammonia to NOX. This greatly reduces the amount of oxidizing agents which must be admitted to the system. Additionally, since less NOX is formed, a less rigorous denitrification process is needed to reduce the NOX to volatile nitrogen compounds such as $N_2$, resulting in a more efficient and economical system.

Several examples were run using the method of the present invention and are set out below. These examples are illustrative of the present invention and are not meant to be limiting.

EXAMPLE 1

A laboratory unit was run in accordance with the conditions of the present invention for five days and the average values of the system conditions were tabulated and are reported in Table 1 below. The system was a typical activated sludge nitrifying system.

TABLE 1

|   | 5-Day Average |
|---|---|
| 1. Influent Flow (1) | 1.25 |
| 2. Recycle Flow (1) | 0.75 |
| 3. Influent $BOD_5$ (ppm) | 102 |

TABLE 1-continued

| | 5-Day Average |
|---|---|
| 4. MLVSS (ppm) | 2,772 |
| 5. Influent TKN (ppm) | 12.1 |
| 6. $NH_3$—N at $T_o$ (ppm) | 7.8 |
| 7. $NH_3$—N after sorption (ppm) | 4.7 |
| 8. N Depletion-Sorption Zone (ppm) | 3.1 |
| 9. Nitrogen loss (ppm) | 2.7 |
| 10. Effluent $NH_3$—N Oxidation Zone (ppm) | <0.1 |
| 11. $F/M_o$ | 0.14 |

As can be seen from the above table, the ammoniacal nitrogen ($NH_3$-N) leaving the BOD oxidation zone averaged less than 0.1 ppm (#10). The $F/M_o$ ratio averaged 0.14, well above the required 0.05.

The ammoniacal nitrogen depletion in the BOD sorption zone averaged 3.1 ppm (value #8; calculated by subtracting the $NH_3$-N after sorption, #7, from the $NH_3$-N at $T_o$, #6).

Of the 3.1 ppm $NH_3$-N removed in th BOD sorption zone, 2.7 ppm is unaccounted for in the system as NOX or other detectible nitrogen compounds.

EXAMPLE 2

In this example the process of the present invention was carried out in an activated sludge system having an anoxic zone positioned between the BOD sorption zone and the BOD oxidation zone. The system was operated for five days and the ammoniacal nitrogen concentration in each section of each zone was calculated and the averages are reported in Table 2 below. The operating conditions were as follows:

| Influent Flow = | 3.11 million gal/day | $F/M_s =$ | 1.045 |
|---|---|---|---|
| Recycle Flow = | 1.00 million gal/day | $F/M_o =$ | 0.30 |
| Internal Recycle = | 3.40 million gal/day | $BOD_T =$ | 112.5 mg/l |
| | | MLVSS = | 2744 mg/l |
| Sorption Volume = | 0.1220 million gal (3 stages) | | |
| Anoxic Volume = | 0.0813 million gal (2 stages) | | |
| Oxidation Volume = | 0.3389 million gal (5 stages) | | |
| TOTAL VOLUME = | 0.5422 million gal | | |

TABLE 2

| 3 Day Average Ammoniacal Nitrogen Concentration | | |
|---|---|---|
| | | $NH_3$—N (ppm) |
| Time Zero | | 13.02 |
| Sorption | 1 | 8.53 |
| | 2 | — |
| | 3 | 7.16 |
| Anoxic | 1 | 4.63 |
| | 2 | 3.77 |
| Oxidation | 1 | 3.18 |
| | 2 | 2.10 |
| | 3 | 1.63 |
| | 4 | 1.44 |
| | 5 | 1.15 |

The extent of ammoniacal nitrogen removal in the BOD sorption zone is calculated by subtracting the $NH_3$-N concentration in the last section of the sorption zone (7.16 ppm) from the $NH_3$-N concentration entering this zone at time zero (13.02). This indicates that about an average of 5.68 ppm of $NH_3$-N was removed per day in the BOD sorption zone.

Although the average $NH_3$-N concentration in the last section of the oxidation zone is 1.15 ppm which is greater then the desired 0.3 ppm, this high average can be explained by peak loading periods, which for example read as high as 3.09 during the first day of operation. As long as the $NH_3$-N concentration remains below 0.3 ppm for a significant portion of the operating period, the inflated averages due to peak loading will not upset the system. Tests taken on the second and fifth days of operation indicated a $NH_3$-N concentration leaving the oxidation zone of about 0.18 ppm.

EXAMPLE 3

In this example, a typical activated sludge system as described above was operated for three days without controlling the ammoniacal nitrogen concentration in the wastewater leaving the oxidation zone. The results are reported in Table 3 below. The operating conditions were as follows:

| Influent Flow = | 3.87 million gal/day | $F/M_s =$ | 0.96 |
|---|---|---|---|
| Recycle flow = | 0.69 million gal/day | $F/M_o =$ | 0.58 |
| Sorption Volume = | 0.2034 million gal (5 stages) | | |
| Oxidation Volume = | 0.3389 million gal (5 stages) | | |
| TOTAL VOLUME = | 0.5423 million gal | | |

TABLE 3

| | | $NH_3$—N Concentration (ppm) | | | |
|---|---|---|---|---|---|
| | | Day 1 | Day 2 | Day 3 | Average |
| Time Zero | | | | | 14.89 |
| Sorption | 1 | 15.19 | 13.12 | 15.16 | 14.49 |
| | 2 | — | — | — | |
| | 3 | 14.92 | 12.90 | 15.16 | 14.32 |
| | 4 | 14.92 | 12.84 | 15.16 | 14.30 |
| | 5 | 14.86 | 12.62 | 15.02 | 14.17 |
| Oxidation | 1 | 14.12 | 12.10 | 15.54 | 13.92 |
| | 2 | 13.84 | 11.84 | 14.80 | 13.49 |
| | 3 | 13.32 | 11.42 | 13.94 | 12.89 |
| | 4 | 13.04 | 11.10 | 13.94 | 12.69 |
| | 5 | 12.88 | 11.10 | 13.94 | 12.64 |

As is shown in stage 5 of the oxidation zone, the $NH_3$-N concentration was consistently at high levels, well above the required 0.3 ppm. A comparison of the average $NH_3$-N concentration at time zero with the concentration in section 5 of the sorption zone, shows that only 0.72 ppm of ammoniacal nitrogen was removed in this zone. This degree of removal is typical of any system of this type and is probably due to some NOX and/or protein formation. This example clearly points out the necessity of keeping the $NH_3$-N concentration of the wastewater leaving the oxidation zone below 0.3 ppm for a significant portion of the operating period.

EXAMPLE 4

An activated sludge system run according to the present ivention was compared to a conventional nitration process, using a common influent. The results are reported in Table 4 below. The operating conditions were as follows:

| Sorption Volume = | 0.1234 million gallons |
|---|---|
| Oxidation Volume = | 0.4657 million gallons |
| TOTAL VOLUME | 0.5891 million gallons |
| $F/M_s =$ | 1.006 |
| $F/M_o =$ | 0.27 |

TABLE 4

|  |  | NH₃—N ppm | NOX ppm | Total N Accounted for ppm |
|---|---|---|---|---|
| Time Zero | Present invention | 14.98 | — |  |
|  | Conventional | 14.98 | — |  |
| Effluent | Present invention | 1.85 | 8.19 | 10.04 |
|  | Conventional | 1.81 | 12.30 | 14.11 |

As can be seen from the results of Table 4, only 0.87 ppm of the ammoniacal nitrogen entering a conventional nitration system is not accounted for as either $NH_3$-N or NOX. In a system run in accordance with the present invention, however, 4.94 ppm of the influent ammoniacal nitrogen is removed without appearing later in the system as $NH_3$-N or NOX. It is this high degree of $NH_3$-N removal which does not later appear in the system as NOX or other nitrogen compounds which require subsequent treatment that makes the present method advantageous over conventional methods.

Having thus described the present invention, what is now deemed appropriate for Letters Patent is set out in the following appended claims.

What is claimed is:

1. In a method for operating an activated sludge system to produce a sludge having rapid settling characteristics and containing an activated biomass species which method comprises:
   (a) forming a mixed liquor in a BOD sorption zone, said mixed liquor being formed by mixing an activated biomass with a soluble $BOD_5$ and ammonia containing wastewater influent under conditions such that at least 25% of the soluble $BOD_5$ is sorbed by said biomass;
   (b) oxidizing the $BOD_5$ in the mixed liquor, including at least part of the $BOD_5$ sorbed in said biomass, in an oxidation zone by contracting the mixed liquor with an oxidizing agent, said oxidizing being effective for oxidizing at least 30% of the total influent $BOD_5$ in the mixed liquor;
   (c) settling the resulting oxidized mixed liquor in a settling zone thereby forming a supernatant liquor and a dense sludge containing activated biomass; and
   (d) recycling at least a portion of the dense sludge to the BOD sorption zone;

the improvement for removing more than at least 2 ppm ammoniacal nitrogen in the BOD sorption zone such that said removed ammoniacal nitrogen does not reappear in the system as NOX or protein, said improvement comprising:

reducing the ammoniacal nitrogen concentration of the mixed liquor in the oxidation zone such that the ammoniacal nitrogen concentration in the mixed liquor leaving said zone is less than about 0.3 ppm and maintaining an overall F/M ratio equal to or greater than about 0.05.

2. The method in accordance with claim 1 wherein greater than 5 ppm of the ammoniacal nitrogen is removed in the BOD sorption zone.

3. The method in accordance with claim 2 wherein an anoxic zone is interposed between the BOD sorption zone and the BOD oxidation zone.

4. The method in accordance with claim 3 wherein the mixed liquor leaving the BOD oxidation zone has an ammoniacal nitrogen concentration less than 0.2 ppm.

5. The method in accordance with claim 4 wherein at least 50% of the soluble $BOD_5$ is sorbed by the biomass in the BOD sorption zone.

6. The method in accordance with claim 5 wherein the ammoniacal nitrogen is removed in the BOD oxidation zone via oxidation by autotrophic microorganisms.

* * * * *